United States Patent
Sotzing et al.

(10) Patent No.: US 7,746,533 B2
(45) Date of Patent: Jun. 29, 2010

(54) ELECTROCHROMIC DEVICES UTILIZING VERY LOW BAND GAP CONJUGATED COUNTER ELECTRODES: PREPARATION AND USE

(75) Inventors: Gregory A. Sotzing, Storrs, CT (US); Venkataramanan Seshadri, Pittsburgh, PA (US)

(73) Assignee: The University of Connecticut, Farmington, CT (US)

( * ) Notice: Subject to any disclaimer, the term of this patent is extended or adjusted under 35 U.S.C. 154(b) by 985 days.

(21) Appl. No.: 11/456,603

(22) Filed: Jul. 11, 2006

(65) Prior Publication Data

US 2007/0008603 A1    Jan. 11, 2007

Related U.S. Application Data

(60) Provisional application No. 60/698,049, filed on Jul. 11, 2005.

(51) Int. Cl.
*G02F 1/15* (2006.01)
*G02F 1/153* (2006.01)

(52) U.S. Cl. .................. 359/265; 359/273; 359/275; 345/49; 345/105; 438/238

(58) Field of Classification Search .............. 359/265, 359/267, 269, 270, 273, 275; 369/126, 275.1–275.3; 345/49, 105; 438/238, 381; 455/575.1
See application file for complete search history.

(56) References Cited

U.S. PATENT DOCUMENTS

| | | | |
|---|---|---|---|
| 4,639,328 A | | 1/1987 | Krause et al. |
| 4,663,001 A | | 5/1987 | Lazzaroni et al. |
| 4,728,177 A | * | 3/1988 | Green .................. 359/270 |
| 4,832,467 A | * | 5/1989 | Miyagi et al. .......... 359/273 |
| 4,910,645 A | | 3/1990 | Jonas et al. |
| 4,959,430 A | | 9/1990 | Jonas et al. |
| 4,986,886 A | | 1/1991 | Wei et al. |
| 5,109,070 A | | 4/1992 | Epstein et al. |
| 5,300,575 A | | 4/1994 | Jonas et al. |
| 5,446,577 A | * | 8/1995 | Bennett et al. ........... 359/273 |
| 5,561,030 A | | 10/1996 | Holdcroft et al. |
| 5,663,829 A | * | 9/1997 | Lefrou et al. .......... 359/275 |
| 5,691,062 A | | 11/1997 | Shalaby et al. |

(Continued)

FOREIGN PATENT DOCUMENTS

CA    2343444 A1    8/1999

(Continued)

OTHER PUBLICATIONS

International Search Report and Written Opinion; International Application No. PCT/US2006/027040; International Filing Date: Nov. 7, 2006; Date of Mailing May 2, 2007; 13 pages.

(Continued)

*Primary Examiner*—Loha Ben
(74) *Attorney, Agent, or Firm*—Cantor Colburn LLP

(57) ABSTRACT

Disclosed herein are electrochromic devices using a very low band-gap conjugated polymer having a band gap (Eg) of less than or equal to about 1.5 eV, and having little or no electrochromism in the visible region of the electromagnetic spectrum.

35 Claims, 2 Drawing Sheets

U.S. PATENT DOCUMENTS

| | | | | |
|---|---|---|---|---|
| 5,737,114 | A * | 4/1998 | Bailey | 359/268 |
| 5,859,723 | A * | 1/1999 | Jodicke et al. | 359/270 |
| 6,194,540 | B1 | 2/2001 | Ito et al. | |
| 6,242,561 | B1 | 6/2001 | Mohwald et al. | |
| 6,294,245 | B1 | 9/2001 | Roitman et al. | |
| 6,645,401 | B2 | 11/2003 | Giles et al. | |
| 6,815,286 | B2 * | 11/2004 | Krieger et al. | 438/238 |
| 7,060,846 | B2 | 6/2006 | Zahn et al. | |
| 7,071,289 | B2 | 7/2006 | Sotzing | |
| 7,094,365 | B2 | 8/2006 | Zahn et al. | |
| 7,118,692 | B2 | 10/2006 | Nordquist et al. | |
| 7,241,904 | B2 | 7/2007 | Zahn et al. | |
| 7,270,871 | B2 | 9/2007 | Jiang et al. | |
| 7,436,754 | B2 * | 10/2008 | Kojima et al. | 369/126 |
| 7,443,566 | B2 * | 10/2008 | Lerenius et al. | 359/265 |
| 2002/0011420 | A1 | 1/2002 | Roitman et al. | |
| 2003/0077515 | A1 | 4/2003 | Chen et al. | |
| 2004/0010115 | A1 | 1/2004 | Sotzing | |
| 2004/0074779 | A1 | 4/2004 | Sotzing | |
| 2005/0124784 | A1 | 6/2005 | Sotzing | |
| 2005/0209419 | A1 | 9/2005 | Zahn et al. | |
| 2006/0147616 | A1 | 7/2006 | Gaudiana et al. | |
| 2006/0223977 | A1 | 10/2006 | Zahn et al. | |

FOREIGN PATENT DOCUMENTS

| | | |
|---|---|---|
| EP | 0999242 B1 | 3/2003 |
| EP | 1510535 A1 | 2/2005 |
| WO | 9106887 | 5/1991 |
| WO | 03046106 A1 | 5/2003 |

OTHER PUBLICATIONS

Carlberg, Catarina, et al; "Ionic Transport and Electronic Structure in Poly(3,4-ethylenedioxythiophene)"; Solid State Ionics; 85; pp. 73-78; (1996).

Chen, Show-An, et al; "Processable Low Band Gap Pi-conjugated Polymer, poly(isothianaphthene)"; Polymer; 37; No. 3; pp. 519-522; (1996).

Gustafsson-Carlberg, J. C., et al.; "Tuning the Bandgap for Polymeric Smart Windows and Displays"; Electrochimica Acta; 40; No. 13-14; pp. 2233-2235; (1995).

Jelle, B. P., et al; "Transmission Spectra of an Electrochromic Window Based on Polyaniline, Tungsten Oxide and a Solid Polymer Electrolyte"; Electrochimica Acta; 37; No. 8; pp. 1377-1380 (1992).

Kumar, Anil, et al; "Conducting Poly(3,4-alkylenedioxythiophene) Derivatives as Fast Electrochromics with High-Contrast Ratios"; Chem. Mater; 10; pp. 896-902; (1998).

Michalak, F., et al; "A Flexible Electrochromic Device Based on Colloidal Tungsten Oxide and Polyaniline"; Solid State Ionics; 85; pp. 265-272; (1996).

Rauh, R.D., et al; "High Coloration Efficiency Electrochromics and Their Application to Multi-color Devices"; Electrochimica Acta; 46; pp. 2023-2029; (2001).

Rocco, A.M., et al; "An Electrochromic Device Combining Polypyrrole and WO3-I. Liquid Electrolyte"; Electrochimica Acta; 41; No. 18; pp. 2805-2816; (1996).

Sapp, Shawn A., et al; "High Contrast Ratio and Fast-Switching Dual Polymer Electrochromic Devices"; Chem. Mater; 10; pp. 2101-2108; (1998).

Yau, S.-T. "Tunneling Spectroscopy and Spectroscopic Imaging of Granular Metallicity of Polyaniline"; Applied Physics Letters; 74; No. 5; pp. 667-669; (1999).

Gu, Synthesis and Characterization of Poly(2-decylthieno(3,4-b)thiophene), Chem Abstract, 125, 87896 (1996).

Neef et al., Synthesis and Electronic Properties of Poly(2-phenylthieno[3,4-b]thiophen), American Chemical Society, 131, 214964 (1999).

Neef et al., Synthesis and Electronic Properties of Poly(2-phenylthieno[3,4-b]thiophene), American Chemical Society, 128, 230943 (1998).

Pomerantz et al., A New Soluble Low-Bandgap Conducting Polymer, Elservier, 126, 293709 (1997).

Silcoff et al., Synthesis of Polymers with Isolated Thiophene-Based Chromophores, Macromolecules, 31, pp. 9116-9120 (1998).

Song Y. Hong et al., Understanding the Conformational Stability and Electronic Structures of Modified Polymers Based on Polythiopene, Macromolecules 1992, pp. 4652-4657.

Hans Wynberg, et al. "Thieno [3,4-b] Thiophene, The Third Thiophthene," Tetrahedron Letter (1967) No. 9, at p. 761-764.

A. Bongini, et al., "New n-Dopable Thiophene Based Polymers"; Synthetic Metals, vol. 101 (1999) p. 13-14.

J. Eldo, et al. "New Low Band Gap Polymers: Control of Optical and Electronic Properties in near Infrared Absorbing Conjugated Polysquaraines"; Chemistry Materials, 2002, vol. 14 p. 410-418.

Gu Xiaomin, Part I: Synthesis and Characterization of Poly (2-Decylthieno[3,4-b]Thiophene), A Low Bandgap Conducting Polymer, Part II: Formation and Trapping of Methoxy-Carbonyl) Ketene (1995) (Ph.D dissertation, University of Texas at Arlington).

Arvind Kumar, et al. "Poly(thienol[3,4-b]furan). A New Low Band Gap Conjugated Polymer", Macromolecules, vol. 39, No. 8, Apr. 18, 2006 at pp. 2724-2725.

Youngkwan Lee, et al. "Synthesis and Characterization of a Soluble and Transparent Conducting Polymer, Poly (3,4-Ethylenedioxythiophene)" Mol. Cryst Liq. Cryst.; 1999, vol. 327 p. 237-240.

Byoungchul Lee, et al. "Aqueous phase Polymerization of Thieno[3,4-b] Thiophene" Polymer Preprints 2002, 43 (2) p. 568-569.

Kyunghoon Lee, et al. "Synthesis of poly(thieno[3,4-b]thiophene) and its electrochemical characterization", Polymer Preprints 2001, 42(2). at p. 413-414.

Kyunghoon Lee, et al. "Toward the Use of Poly(Thieno[3,4-b)Thiophene in Optoelectronic Devices," Polymer Preprints 2002, 43(2) at p. 610-611.

Kyunghoon Lee, et al. "Thieno[3,4-b]thiophene as a Novel Low Oxidation Crosslinking Agent," Polymeric Materials: Science and Engineering 2002, 86, at p. 195.

D.C. Loveday, et al. "Synthesis and Characterization of p- and n-Dopable Polymers. Electrochronic Properties of Poly 3-(p-trimethylammoniumphenyl)bthiophene," Synthetic Metals 84 (1997) at p. 245-246.

H. Meng, et al. "A Robust Low Band Gap Processable n-Type Conducting Polymer Based on Poly (isothianaphthene)," Macromolecules (2001) 34 at p. 1810-1816.

C.J. Neef, et al. "Synthesis and Electronic Properties of Poly(2-phenylthieno[3,4-b]thiophene): A New Low Band Gap Polymer," Chem. Mater. (1999), 11, at p. 1957-1958.

C.J. Neef, et al. "Synthesis and Electronic Properties of Poly(2-phenylthieno[3,4-b]thiophene)," Polym. Prepr. (1998), 39, at p. 147-148.

Martin Pomerantz, et al. "Poly(2-decylthieno[3,4-b]thiophene). A New Soluble Low-Bandgap Conducting Polymer," Synthetic Metals 84 (1997) 243-244.

Martin Pomerantz, et al. "Poly(2-decylthieno[3,4-b]thiophene-4,6-diyl). A New Low Band Gap Conducting Polymer," Macromolecules 34 (2001) 1817-1822.

Benjamin Reeves, et al. "Dual Cathodically and Anodically Coloring Electrochromic Polymer Based on a Spiro Bipropylenedioxythiophene [Poly(spiroBiProDOT)]**," Advanced Materials (2002), 14, No. 10 May 17 at p. 717-719.

J. Roncali, et al. "Enhancement of the Mean Conjugation Length in Conducting Polythiophenes," Synthetic Metals, 18 (1987) at p. 139-144.

Venkataramanan Seshadri, et al. "Ion Transport Behavior of Polymers and Copolymers containing Thieno[3,4-b]Thiophene," Polymer Preprints 2002, 43(2) at p. 584-585.

Gregory Sotzing, et al "Preparation and Characterization of Fully Conjugated Intrinsically Conducting Polymer Networks," Polymeric Materials: Science and Engineering (2002), 86, at p. 40-41.

Gregory Sotzing, et al "Intrinsically Conducting Polymers and Green Chemistry" Polymer Preprints (2002), 43(2), at p. 904.

Gregory Sotzing, et al. "Poly(thieno[3,4-b]thiophene) as a Low Band Gap Conducting Polymer and Electrochromic Material" Polymeric Materials: Science and Engineering (2001) 85, at p. 604.

Kyunghoon Lee et al., "Poly(thieno[3,4-b] thiophene). A New Stable Low Band Gap Conducting Polymer," Macromolecules 2001, 34, 5746-5747.

John Moursounidis et al., "The Synthesis of Thieno [3,4-b] Furan Using a Tandem Intramolecular-Reverse Diels-Alder Reaction Approach," Tetrahedron Letters, vol. 27, No. 26, pp. 3045-3048, 1986.

* cited by examiner

ELECTROCHROMIC DEVICES UTILIZING VERY LOW BAND GAP CONJUGATED COUNTER ELECTRODES: PREPARATION AND USE

CROSS-REFERENCE TO RELATED APPLICATIONS

This application claims the benefit of U.S. Patent Application Ser. No. 60/698,049, filed Jul. 11, 2005, which is incorporated by reference herein in its entirety.

BACKGROUND

Electrochromic devices take advantage of materials that are able to change their optical properties in a reversible and repeatable way under the application of an electrical current or potential. These materials include inorganic semiconductors and certain conjugated polymers.

These devices have the advantage of being able to tune through various redox states by the application of a small voltage to the devices as opposed to the dependence of external lighting conditions by photochromic materials. Known configurations of electrochromic devices include solution phase electrochromics where the diffusion of the electrochromic species from the solution to the electrode is followed by a redox reaction on the electrode surface accompanied by a color transition. Liquid crystals take advantage of alignment induced by an electric field, which induces a change in optical density of the material. A drawback of liquid crystals is that most require a constant supply of power to generate the effect. Another configuration includes Suspended Particle Devices (SPDs) where millions of suspended particulates are sandwiched between two transparent electrodes. Application of a potential leads to alignment of the particulates resulting in the transmission of light. The intensity of transmitted light can be controlled by varying the applied potential. Still yet another configuration includes electrochromic films where thin films of organic or inorganic materials, which exhibit reversible electrochromism by undergoing electrochemical reactions, are coated onto an electrode.

Solution phase electrochromics and liquid crystal configurations are limited by the diffusion speed of the electrochromic materials and supporting electrolytes towards the electrode. Thin film electrochromics, however, need only one species to diffuse towards the electrode resulting in higher switching speeds for thin film electrochromics as compared to the first two described configurations.

There remains a continuing need in the art, however, for electrochromic devices exhibiting faster switching capabilities, long-term repeatability of switching between states, reduced power consumption, and little or no color distortion.

BRIEF SUMMARY OF THE INVENTION

Disclosed herein is an electrochromic device comprising a first layer comprising a first conjugated polymer, wherein the first conjugated polymer has a band gap of less than or equal to about 1.5 eV and an Lmax absorption peak of greater than or equal to about 750 nm in the neutral, oxidized, and reduced forms, and wherein the first layer functions as an ion-storage layer; a second layer comprising a second conjugated polymer, wherein the second conjugated polymer has a band gap of less than about 2.5 eV and wherein the second layer functions as an electrochromic in the visible region of the electromagnetic spectrum; an electrolyte layer disposed between and in contact with the first layer and the second layer; a first electrode in electrical communication with the first layer; and a second electrode in electrical communication with the second layer.

In another embodiment, an electrochromic device comprises a first layer comprising a first conjugated polymer, wherein the first conjugated polymer has a band gap of less than or equal to about 1.5 eV and an Lmax absorption peak of greater than or equal to about 750 nm in the neutral, oxidized, and reduced forms, and wherein the first layer functions as an ion-storage layer; a second layer comprising an ion-chelating inorganic structure that reversibly binds to counter-ions; an electrolyte layer in contact with the first layer and the second layer; a first electrode in electrical communication with the first layer; and a second electrode in electrical communication with the second layer.

In yet another embodiment, an electrochromic device comprises a substantially transparent outer layer; a first electrode located behind the transparent outer layer, wherein the first electrode comprises a reflective surface facing the outer layer and a means for allowing ions to pass through the first electrode; a first layer comprising a first conjugated polymer disposed between the reflective surface and the transparent outer layer and in electrical communication with the first electrode, wherein the first conjugated polymer is an electrochromic material; a first electrolyte layer in contact with the first layer and the first electrode; a second electrode located behind the transparent outer layer and behind the first electrode; a second layer comprising a second conjugated polymer, wherein the second conjugated polymer has a band gap of less than or equal to about 1.5 eV and an Lmax absorption peak of greater than or equal to about 750 nm in the neutral, oxidized, and reduced forms, wherein the second layer is disposed on and in electrical communication with the second electrode; and a second electrolyte layer disposed between the second layer and the first electrode.

DETAILED DESCRIPTION OF THE INVENTION

Figure 1:
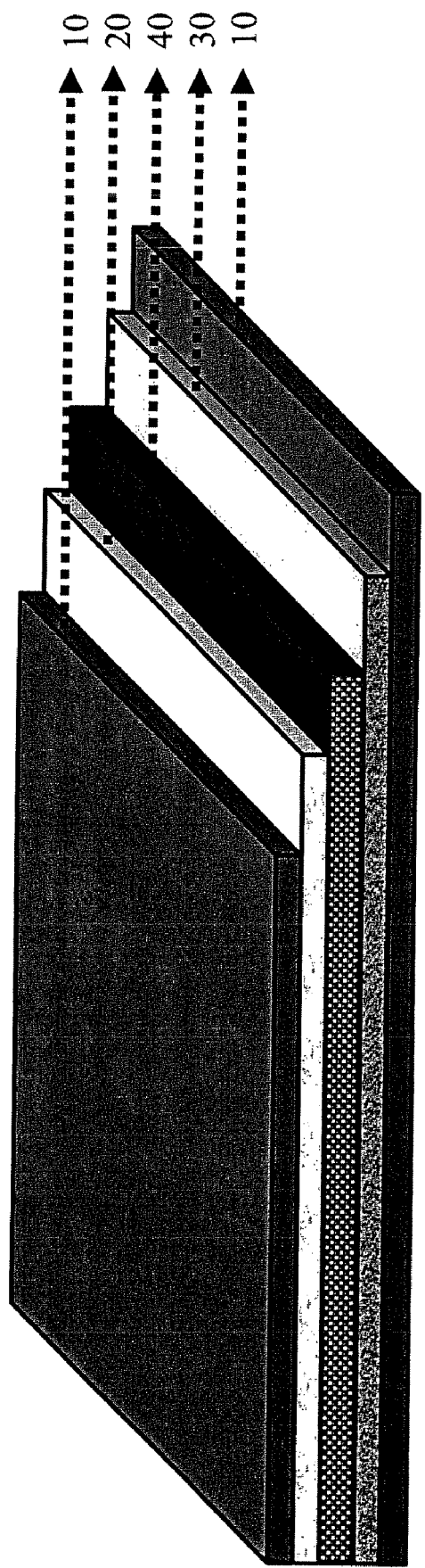
FIG. 1 illustrates a five-layer configuration of a dual polymer based transmissive type electrochemical device.
Figure 2:
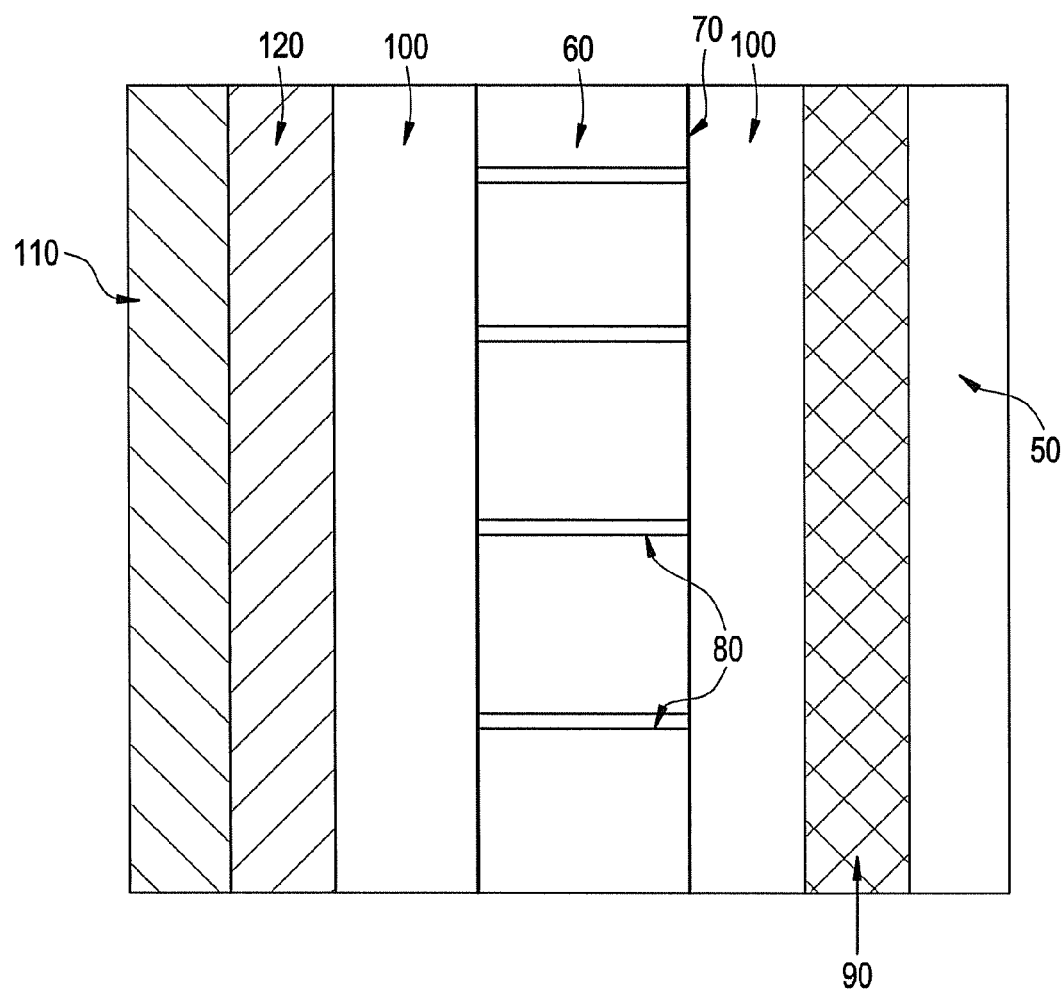
FIG. 2 illustrates a reflective type electrochromic device.

Disclosed herein are electrochromic cell device designs, preparation, and use thereof. Specifically, a very low bandgap polymer having a band gap (Eg) of less than or equal to about 1.5 electron volts (eV), and having little or no electrochromism in the visible region of the electromagnetic spectrum in the different redox states, is used as a charge-compensating layer in the electrochromic device.

Electrochromism of the conjugated polymer is accompanied with ion-transport from an adjacent electrolyte layer due to the injected positive or negative charges. The excess counter-ions now present in the electrolyte are balanced by ion movement into or out of the counter electrode, which optionally has electrochromic functionality. The design of the electrochromic device can be used to operate in transmissive or reflective mode.

As used herein, the band gap (Eg) means the onset for the valence to conduction band.

As used herein a "very low band gap conjugated polymer" means a conjugated polymer having an Eg of less than or equal to about 1.5 eV and having an absorption peak (Lmax)>750 nm in the neutral, oxidized and reduced forms corresponding to little or no electrochromism in the visible region of the electromagnetic spectrum.

As used herein a "low band gap conjugated polymer" means a conjugated polymer having an Eg of about 1.6 to about 2.5 eV.

As used herein a "high band gap conjugated polymer" means a conjugated polymer having an Eg of greater than 2.5 eV.

In one embodiment, a dual polymer electrochromic cell device is contemplated wherein the device has two conjugated polymer layers where the conjugated polymers behave in a similar manner with respect to response speed and operating potential range.

Known dual polymer systems typically have one layer of a low band-gap polymer (e.g., an Eg of about 1.6-1.7 eV) with an absorption peak in the visible region for the cathodically coloring material while the other layer has a high band-gap polymer (e.g., Eg of greater than or equal to about 3.0 eV) with an absorption peak typically in the high energy visible to low energy ultraviolet (UV) region for the anodically coloring material. These high band-gap materials, however, exhibit a peak in the UV region that has an absorption edge usually tailing into the visible region producing a yellow coloration. This yellow coloration results in a color distortion for the observer of the device.

Certain polyaromatic compounds are known to show high absorptivities even with a fewer number of conjugated units. Thus a slight yellow tinge due to an absorption tail from the UV into the visible can be expected in the neutral states of most high band-gap conjugated polymers. The color perceived by the observer through this yellow tinge is known to produce a permanent color distortion that the eye cannot correct for.

It has now been found that the use of a very low band-gap polymer in place of the high band gap polymer, does not produce such a yellow coloration. Specifically, the very low band gap conjugated polymer has an Eg of less than or equal to about 1.5 eV, an absorption peak of >750 nm in the neutral, oxidized and reduced forms, and little or no electrochromism in the visible spectrum.

The dual polymer electrochromic devices disclosed herein utilize a very low band gap polymer for one of the polymer layers. This layer is used as an ion-storage layer. The second layer used as the electrochromic utilizes a low band gap conjugated polymer (Eg of about 1.6 to about 2.5 eV). Optionally the second layer can be prepared from a very low band gap conjugated polymer. This format offers many advantages over a low band gap/high band gap dual conjugated polymer electrochromic devices. Color distortion is avoided when a very low band-gap polymer (Lmax>750 nm), which has a faint blue tinge or no color in either of the redox states, is used in a complementary manner with a second polymer on the opposing electrode that will provide the electrochromic functionality. Due to the low absorbance of this polymer there will be essentially no color mixing, i.e., the color transition due to the electrochromic material on the other electrode is more pure. There is potential use of these devices in electrochromic displays and transmission devices with negligible or no color distortion.

The oxidized form of the very low band-gap polymer is highly absorbing in the near infrared (NIR) to the infrared (IR) regions of the electromagnetic spectrum upon oxidation and reduction and hence could have potential use as an IR electrochromic. Dual polymer electrochromics incorporating a conjugated polymer exhibiting colored transitions within the visible region and one with little or no color in the visible region could exhibit IR absorbing capabilities in either of the states, useful for absorbing heating IR radiations.

Further advantages include the reduction of power consumption due to the narrowing of the potential window for switching and faster switching speeds due to better energy matching between the electrode and the conjugated polymer.

The current electrochromic devices described herein can switch in a few milliseconds and exhibit long open circuit memory in the different optical states, i.e., they can retain the optical states for very long times and can be switched to different states for several thousand times.

An exemplary five-layer electrochromic device having a dual polymer configuration is shown in FIG. 1 (electrical connections not shown). In FIG. 1, a transmissive type electrochromic device contains electrodes (10) separated from an electrolyte layer (40) by a first conjugated polymer layer (20) and a second conjugated polymer layer (30). When the first conjugated polymer (P1) of the first layer is in the oxidized form, the second conjugated polymer (P2) of the second layer is in its neutral state. Upon applying a potential P1 is switched to the neutral state while P2 is switched to the oxidized state. A simple reaction scheme showing this concept is shown below in the form of two half reactions during the redox process and the combined reaction.

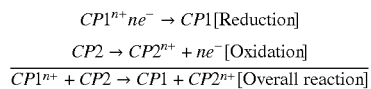

In one embodiment, at least one of the conjugated polymer layers is a very low band gap polymer while the other is a low band gap polymer. In another embodiment, both of the conjugated polymer layers are very low band gap conjugated polymers.

In another embodiment, a reflective type electrochromic device contains a layer of very low band gap conjugated polymer as the counter electrode and as an ion source. An exemplary schematic of a reflective type electrochromic device is described in U.S. Pat. No. 5,446,577 to Bennett et al. incorporated herein by reference. The electrochromic device generally will have a substantially transparent outer layer (50); a first electrode (60) located behind the transparent outer layer (50), wherein the first electrode (60) comprises a reflective surface (70) facing the outer layer (50) and a means (80) for allowing ions to pass through the first electrode (60); a first layer (90) comprising a first conjugated polymer disposed between the reflective surface (70) and the transparent outer layer (50), wherein the first conjugated polymer is an electrochromic material; an electrolyte (100) in contact with the electrochromic material and the first electrode (60); and a second electrode (110) located behind the transparent outer layer (50) and behind the first electrode (60); a second layer (120) comprising a second conjugated polymer, wherein the second conjugated polymer has a band gap of less than or equal to about 1.5 eV and an Lmax absorption peak of greater than or equal to about 750 nm in the neutral, oxidized, and reduced forms, where the second layer (120) is disposed on the second electrode (110); and an electrolyte (100) disposed between the second layer (120) and the first electrode (60).

In one embodiment, the electrochromic material and the ion source on the second electrode is a layer of very low band gap conjugated polymer as described herein.

Also contemplated herein are single polymer layer devices utilizing a very low band gap conjugated polymer. To complete the redox reaction the single polymer device uses a charge compensating layer on the counter-electrode. The redox cells can be constructed using organic and inorganic hybrids, wherein the second electrode has been coated with ion-chelating inorganic structures to reversibly bind to the counter-ions moving towards it due to polarization effects of the DC voltage applied.

Suitable ion-chelating inorganic structures include metal oxide layers, for example tungsten oxide (WO$_3$), nickel oxide, and the like.

Conjugated polymers as used herein include intrinsically conducting polymers that possess a relatively low band gap (Eg), which refers to the energy difference between two electronic energy levels (the conduction band and the valence band). The band gap exhibited by a given conjugated polymer depends upon a variety of factors, including the structure of the monomer(s) used to form the polymer. For example, conjugated polymers formed from thiophene and substituted thiophene monomers are known. Exemplary conjugated polymers include poly(thiophene) having a band gap of 2.1 eV; 3,4-alkylenedioxypyrroles such as poly(3,4-ethylenedioxypyrrole), or "PEDOP", 2.0 eV, and poly(3,4-propylenedioxypyrrole), or "PProDOP", 2.2 eV; poly(3,4-alkylenedioxythiophenes), such as poly(3,4-ethylenedioxythiophene), or "PEDOT" and poly(3,4-propylenedioxythiophene), or "PProDOT", 1.6-1.7 eV; poly(2-decylthieno[3,4-b]thiophene), 0.92 eV; and poly(2-phenylthieno[3,4-b]thiophene), 0.85 eV. High band gap (>2.5 eV) conjugated polymers include, for example, N-propane sulfonated poly(3,4-propylenedioxypyrrole), or "PProDOP"; poly(phenylene vinylene), or "PPV"; poly(p-phenylene), or "PPP"; and the like.

Exemplary low and very low band gap polymers include polymers prepared from electroactive monomers. Electroactive monomers include those that exhibit electroactivity, including but not limited to thiophene, substituted thiophenes, thieno[3,4-b]thiophene, substituted thieno[3,4-b]thiophenes, thieno[3,4-b]furan, substituted thieno[3,4-b]furans, dithieno[3,4-b:3',4'-d]thiophene, bithiophene, substituted bithiophenes, pyrrole, substituted pyrroles, phenylene, substituted phenylenes, naphthalene, substituted naphthalenes, biphenyl, substituted biphenyls, terphenyl, substituted terphenyls, phenylene vinylene, substituted phenylene vinylenes, or a combination comprising at least one of the foregoing monomers. Unless otherwise indicated, the term "substituted" as used herein means replacement of one or more hydrogens with one or more substituents that include hydroxyl, C$_6$-C$_{12}$ aryl, C$_3$-C$_{10}$ cycloalkyl, C$_1$-C$_{12}$ alkyl, halogen, C$_1$-C$_{12}$ alkoxy, C$_1$-C$_{12}$ alkylthio, C$_1$-C$_{12}$ haloalkyl, C$_6$-C$_{12}$ haloaryl, pyridyl, cyano, thiocyanato, nitro, amino, C$_1$-C$_{12}$ alkylamino, C$_1$-C$_{12}$ aminoalkyl, acyl, sulfoxyl, sulfonyl, sulfonate, phosphonate, amido, and/or carbamoyl.

The choice and amount of the particular monomer will dictate the properties of the resulting polymer including its optoelectronic properties. As the presence of phenyl groups are known to result in high band gap polymers, their use should be controlled if a low or a very low band gap conjugated polymer is desired. For example, polybenzenes and polycarbazoles having heterocyclic spacers in between each phenyl and each carbazole repeat unit result in high band gap polymers. Choice of the particular monomer can be made by one of ordinary skill in the art without undue experimentation.

In one embodiment, the very low and/or low band gap polymer contains units derived from thieno[3,4-b]thiophene and/or thieno[3,4-b]furan represented by the general formula (I):

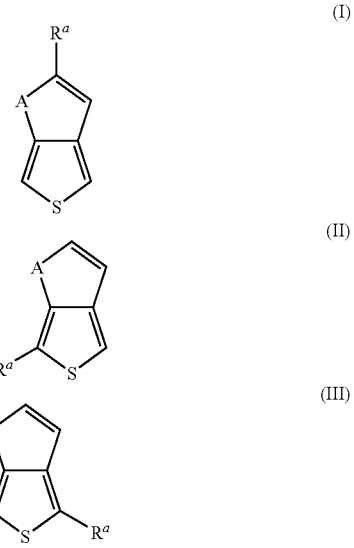

wherein A is S or O; and R$^a$ is hydrogen, hydroxyl, C$_6$-C$_{12}$ aryl, C$_3$-C$_{10}$ cycloalkyl, C$_1$-C$_{12}$ alkyl, halogen, C$_1$-C$_{12}$ alkoxy, C$_1$-C$_{12}$ alkylthio, C$_1$-C$_{12}$ haloalkyl, C$_1$-C$_{12}$ haloalkoxy, C$_6$-C$_{12}$ haloaryl, pyridyl, cyano, thiocyanato, nitro, amino, C$_1$-C$_{12}$ alkylamino, C$_1$-C$_{12}$ aminoalkyl, acyl, sulfoxyl, sulfonyl, sulfonate, phosphonate, amido, or carbamoyl. Exemplary thieno[3,4-b]thiophene polymers and methods to prepare the same are described in U.S. Published Applications US2005/0124784 A1; US20040074779 A1; and US2004/0010115 A1 each of which is incorporated herein by reference in their entirety. Exemplary thieno[3,4-b]furan polymers are described in U.S. provisional application Ser. No. 60/698,050, and unpublished application filed Jul. 11, 2006, entitled "Polymers of Thieno[3,4-b]furan, Method of Making, and Use Thereof", incorporated by reference herein in their entirety.

The very low and/or low band gap polymer containing units derived from thieno[3,4-b]thiophene and/or thieno[3,4-b]furan represented by the general formula (I), (II), or (III) can contain one or more additional monomers ("co-monomers") which provide a tailoring of the conductivity and/or optoelectronic properties of the resulting co-polymer. The co-monomers can include electroactive co-monomers and/or non-electroactive co-monomers. "Electroactive co-monomer" as used herein means a monomer or oligomer that is capable of copolymerization with the thieno[3,4-b]furan/thiophene, and that imparts or enhances the electrical/electronic properties of the resulting copolymer, including such properties as electrical conductivity, semiconductivity, electroluminescence, electrochromicity, photovoltaic properties, and/or the like. "Non-electroactive co-monomer" means a monomer that is capable of copolymerization and that either decreases or does not adversely affect the electrical/electronic properties of the resulting copolymer.

Examples of suitable electroactive co-monomers include those known in the art to exhibit electroactivity, including but not limited to thiophene, substituted thiophenes, thieno[3,4-b]thiophene, substituted thieno[3,4-b]thiophenes, thieno[3,4-b]furan, substituted thieno[3,4-b]furans, dithieno[3,4-b:3',4'-d]thiophene, bithiophene, pyrrole, substituted pyrrole, phenylene, substituted phenylene, naphthalene, substituted naphthalene, biphenyl, substituted biphenyl, terphenyl, substituted terphenyl, phenylene vinylene, substituted phenylene vinylene, or a combination comprising at least one of the foregoing co-monomers. Again, the choice of amount and type of co-monomer can be made to result in a co-polymer having an Eg of less than or equal to about 2.5 eV, specifically less than or equal to about 2.0, more specifically less than or equal to about 1.8 eV, and yet more specifically less than or equal to about 1.5 eV and optionally further having little or no electrochromism in the visible region of the electromagnetic spectrum.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, "—CHO" is attached through carbon of the carbonyl group.

As used herein, "alkyl" includes both branched and straight chain saturated aliphatic hydrocarbon groups, having the specified number of carbon atoms, generally from 1 to about 12 carbon atoms. Examples of alkyl include, but are not limited to, methyl, ethyl, n-propyl, isopropyl, n-butyl, 3-methylbutyl, t-butyl, n-pentyl, and sec-pentyl. Alkyl groups described herein typically have from 1 to about 12 carbons atoms. Specific alkyl groups include lower alkyl groups, those alkyl groups having from 1 to about 8 carbon atoms, from 1 to about 6 carbon atoms, or from 1 to about 4 carbons atoms. As used herein "haloalkyl" indicates both branched and straight-chain alkyl groups having the specified number of carbon atoms, substituted with 1 or more halogen atoms, generally up to the maximum allowable number of halogen atoms ("perhalogenated"). Examples of haloalkyl include, but are not limited to, trifluoromethyl, difluoromethyl, 2-fluoroethyl, and penta-fluoroethyl.

As used herein, "alkoxy" includes an alkyl group as defined above with the indicated number of carbon atoms attached through an oxygen bridge (—O—). Examples of alkoxy include, but are not limited to, methoxy, ethoxy, n-propoxy, i-propoxy, n-butoxy, 2-butoxy, t-butoxy, n-pentoxy, 2-pentoxy, 3-pentoxy, isopentoxy, neopentoxy, n-hexoxy, 2-hexoxy, 3-hexoxy, and 3-methylpentoxy. "Haloalkoxy" indicates a haloalkyl group as defined above attached through an oxygen bridge.

As used herein, "cycloalkyl" indicates a monocyclic or multicyclic saturated or unsaturated hydrocarbon ring group, having the specified number of carbon atoms, usually from 3 to about 10 ring carbon atoms. Monocyclic cycloalkyl groups typically have from 3 to about 8 carbon ring atoms or from 3 to about 7 carbon ring atoms. Multicyclic cycloalkyl groups may have 2 or 3 fused cycloalkyl rings or contain bridged or caged cycloalkyl groups. Examples of cycloalkyl groups include cyclopropyl, cyclobutyl, cyclopentyl, or cyclohexyl as well as bridged or caged saturated ring groups such as norbornane or adamantane.

As used herein, the term "aryl" indicates aromatic groups containing only carbon in the aromatic ring or rings. Such aromatic groups may be further substituted with carbon or non-carbon atoms or groups. Typical aryl groups contain 1 or 2 separate, fused, or pendant rings and from 6 to about 12 ring atoms, without heteroatoms as ring members. Where indicated aryl groups may be substituted. Such substitution may include fusion to a 5 to 7-membered saturated cyclic group that optionally contains 1 or 2 heteroatoms independently chosen from N, O, S, Se, and Si to form, for example, a 3,4-methylenedioxy-phenyl group. Aryl groups include, for example, phenyl, naphthyl, including 1-naphthyl and 2-naphthyl, and bi-phenyl.

As used herein, "halo" or "halogen" refers to fluoro, chloro, bromo, or iodo.

In one embodiment, a polymer containing units of general formula (I), (II), or (III), wherein $R^a$ is hydrogen and A is S or O. Exemplary polymers include poly(thieno[3,4-b]thiophene); poly(thieno[3,4-b]furan); poly(thieno[3,4-b]thiophene-co-3,4-alkylenedioxythiophene) or poly(thieno[3,4-b]furan-co-3,4-alkylenedioxythiophene) wherein the alkylene group is ethylene, propylene, and the like; poly(thieno[3,4-b]thiophene-co-thieno[3,4-b]furan); and the like.

Suitable monomers and co-monomers include substituted thiophenes, furans, pyrroles, and their derivatives having the general structure (IV):

(IV)

wherein $X^1$ is S, O, or N—$R^5$, wherein $R^5$ is hydrogen or $C_1$-$C_{12}$ alkyl; X is $C_1$-$C_4$ alkylene or substituted $C_1$-$C_4$ alkylene. In one embodiment, X is $C_1$-$C_{12}$ alkyl- or $C_6$-$C_{12}$ phenyl-substituted ethylene, or a 1,2-cyclohexylene. Optionally, the alkyl or phenyl groups can be further substituted as described above. An exemplary substituted thiophene includes 3,4-ethylenedioxythiophene.

Additional suitable monomers and co-monomers include un-substituted and substituted thiophenes, furans, pyrroles, and their derivatives having the structure (V):

(V)

wherein $X^1$ is as previously defined; $R^3$ and $R^4$ are the same or different and are hydrogen, hydroxyl, $C_6$-$C_{12}$ aryl, $C_3$-$C_{10}$ cycloalkyl, $C_1$-$C_{12}$ alkyl, $C_1$-$C_{12}$ alkoxy, $C_1$-$C_{12}$ alkylthio, halogen, $C_1$-$C_{12}$ haloalkyl, $C_1$-$C_{12}$ haloalkoxy, $C_6$-$C_{12}$ haloaryl, —$C_1$-$C_6$ alkyl-O—$C_1$-$C_6$ alkyl, or —$C_1$-$C_6$ alkyl-O—$C_6$-$C_{12}$ aryl.

Other suitable monomers and co-monomers include oxazoles, thiazoles, and their derivatives having the general structure (VI):

(VI)

wherein $Q^1$ is S or O.

Other electroactive monomers and co-monomers include, for example, isathianaphthene, pyridothiophene, pyrizinothiophene, and derivatives according to the general structure (VII):

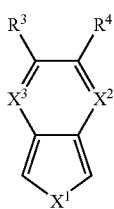

(VII)

wherein $X^1$, $R^3$, and $R^4$ is are as previously defined; wherein $X^2$ and $X^3$ are the same or different and are CH or N.

More suitable monomers and co-monomers include 3,4-ethylenedioxypyrrole, 3,4-ethylenedioxythiophene, 3,4-ethylenedithiathiophene, 3,4-ethylenedithiapyrrole, 3,4-ethylenedioxyfuran, 3,4-ethylenedithiafuran, and their derivatives having the general structure (VIII):

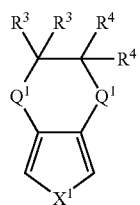

(VIII)

wherein $X^1$, $Q^1$, $R^3$, and $R^4$ are as previously defined; and wherein each occurrence of $Q^1$, $R^3$, or $R^4$ may be the same or different.

Yet other suitable monomers and co-monomers include thionapthenes, benzofurans, indoles, and their derivatives as shown in the general structure (IX):

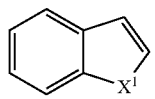

(IX)

wherein $X^1$ is as previously defined.

Further examples of suitable monomers and co-monomers include thienofurans, thienopyrroles, furanylpyrroles, furanylfurans, pyrrolylpyrroles, and derivatives as shown in the structure (X):

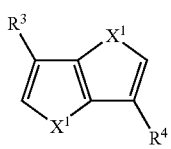

(X)

wherein $X^1$, $R^3$, and $R^4$ are as previously defined; and wherein each occurrence of $X^1$ may be the same or different.

Still other suitable monomers and co-monomers include dithienothiophenes, difuranylthiophenes, dipyrrolylthiophenes, dithienofurans, dipyrrolylfurans, dipyrrolylpyrroles, and derivatives as shown in the general structure (XI):

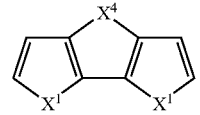

(XI)

wherein $X^1$ is as previously defined; and wherein each occurrence of $X^1$ may be the same or different; and $X^4$ is $C(R^3)_2$, S, O, or N—$R^5$, wherein $R^3$ and $R^5$ are as previously defined.

Other suitable monomers and co-monomers include bithiophenes, bifurans, bipyrroles, and their derivatives as shown in the general structure (XII):

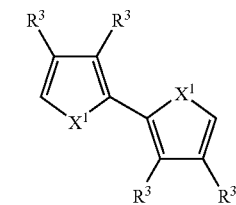

(XII)

wherein $X^1$ and $R^3$ are as previously defined; and wherein each occurrence of $X^1$ or $R^3$ may be the same or different.

More suitable monomers and co-monomers include terthiophenes, terfurans, terpyrroles, and their derivatives as shown in the general structure (XIII):

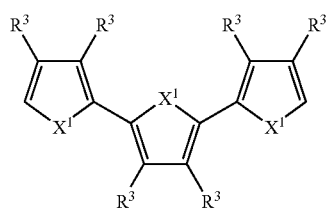

(XIII)

wherein $X^1$ and $R^3$ are as previously defined; and wherein each occurrence of $X^1$ or $R^3$ may be the same or different.

Other suitable monomers and co-monomers include dithienylcyclopentenones, difuranylcyclopentenones, dipyrrolylcyclopentenones, and their derivatives as shown in the general structure (XIV):

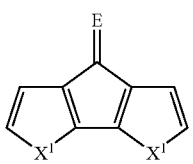

(XIV)

wherein $X^1$ is as previously defined; and wherein each occurrence of $X^1$ may be the same or different; and E is O or $C(R^7)_2$, wherein each occurrence of $R^7$ is an electron withdrawing group.

More suitable monomers and co-monomers include heteroaryl monomers having the general structure (XV):

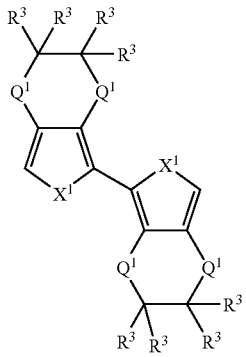

(XV)

wherein $X^1$, $Q^1$, and $R^3$ are as previously defined; and wherein each occurrence of $X^1$, $Q^1$, or $R^3$ may be the same or different.

More suitable monomers and co-monomers include dithienovinylenes, difuranylvinylenes, dipyrrolylvinylenes, and their derivatives having the general structure (XVI):

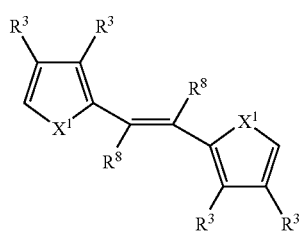

(XVI)

wherein $X^1$ and $R^3$ are as previously defined; and wherein each occurrence of $X^1$ or $R^3$ may be the same or different; and each occurrence of $R^8$ is hydrogen, $C_1$-$C_6$ alkyl, or cyano.

More suitable monomers and co-monomers include 1,2-trans(3,4-ethylenedioxythienyl)vinylenes, 1,2-trans(3,4-ethylenedioxyfuranyl)vinylenes, 1,2-trans(3,4ethylenedioxypyrrolyl)vinylenes, and their derivatives having the general structure (XVII):

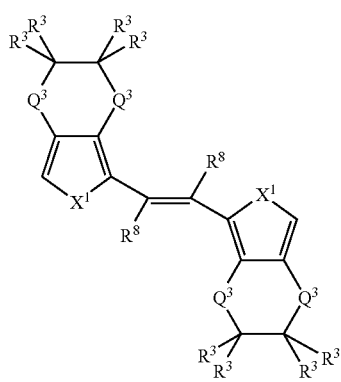

(XVII)

wherein $X^1$, $R^3$, and $R^8$ are as previously defined; and wherein each occurrence of $X^1$, $R^3$, or $R^8$ may be the same or different; and each occurrence of $Q^3$ is independently $CH_2$, S, or O.

More examples of suitable monomers and co-monomers include bis-thienylarylenes, bis-furanylarylenes, bis-pyrrolylarylenes, and their derivatives having the general structure (XVIII):

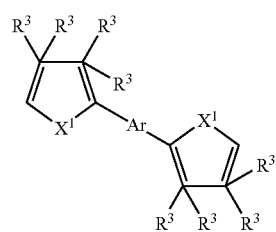

(XVIII)

wherein $X^1$ and $R^3$ are as previously defined; and wherein each occurrence of $X^1$ or $R^3$ may be the same or different; and Ar is a furan, pyrrole, N-substituted pyrrole, phenyl, biphenyl, thiophene, fluorene, or 9-alkyl-9H-carbazole.

Other suitable monomers and co-monomers include compounds having the general structure (XIX):

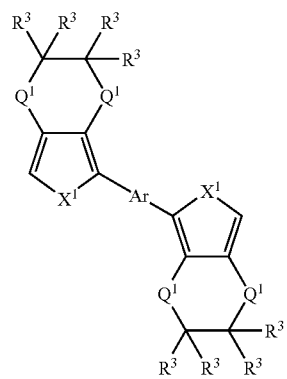

(XIX)

wherein $X^1$, $Q^1$, $R^3$, and Ar are as previously defined; and wherein each occurrence of $X^1$, $Q^1$, or $R^3$ may be the same or different.

Other suitable monomers and co-monomers include compounds having the general structure (XX):

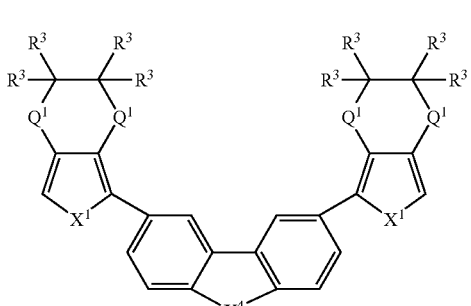

(XX)

wherein $X^1$, $X^4$, $Q^1$, and $R^3$ are as previously defined; and wherein each occurrence of $X^1$, $Q^1$, or $R^3$ may be the same or different.

Other suitable monomers and co-monomers include compounds having the general structure (XXI):

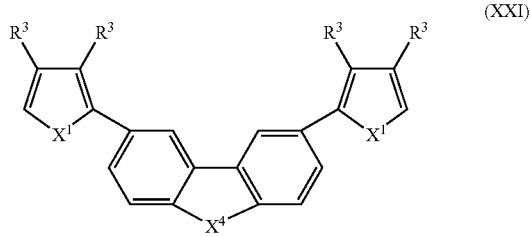

(XXI)

wherein $X^1$, $X^4$, and $R^3$ are as previously defined; and wherein each occurrence of $X^1$ or $R^3$ may be the same or different.

Other suitable monomers and co-monomers include compounds having the general structure (XXII):

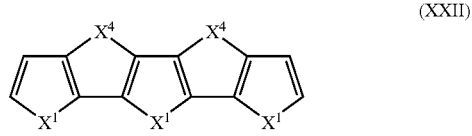

(XXII)

wherein $X^1$ and $X^4$ are as previously defined; and wherein each occurrence of $X^1$ or $X^4$ may be the same or different.

Other suitable monomers and co-monomers include compounds having the general structure (XXIII):

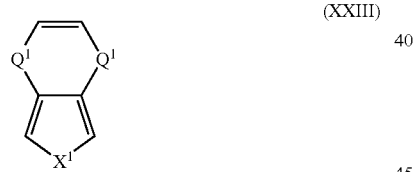

(XXIII)

wherein $X^1$ and $Q^1$ are as previously defined; and wherein each occurrence of $Q^1$ may be the same or different.

Other suitable monomers and co-monomers include compounds having the general structure (XXIV):

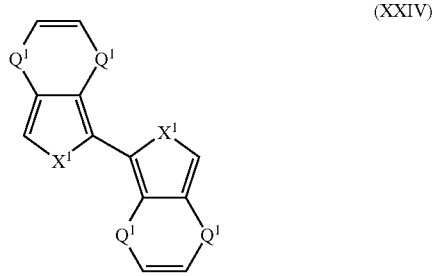

(XXIV)

wherein $X^1$ and $Q^1$ are as previously defined; and wherein each occurrence of $X^1$ or $Q^1$ may be the same or different.

Other suitable monomers and co-monomers include compounds having the general structure (XXV):

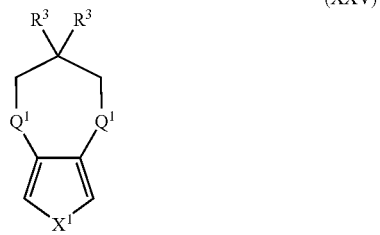

(XXV)

wherein $X^1$, $R^3$, and $Q^1$ are as previously defined; and wherein each occurrence of $R^3$ or $Q^1$ may be the same or different.

Other suitable monomers and co-monomers include compounds having the general structure (XXVI):

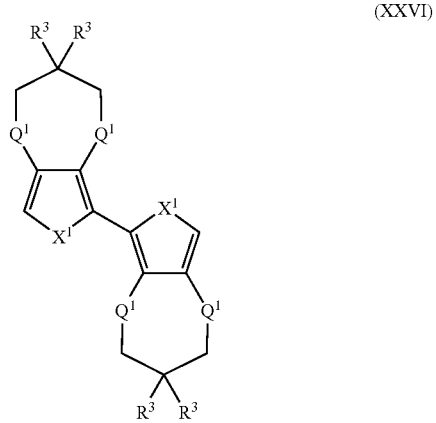

(XXVI)

wherein $X^1$, $R^3$, and $Q^1$ are as previously defined; and wherein each occurrence of $X^1$, $R^3$, or $Q^1$ may be the same or different.

Other suitable monomers and co-monomers include compounds having the general structure (XXVII):

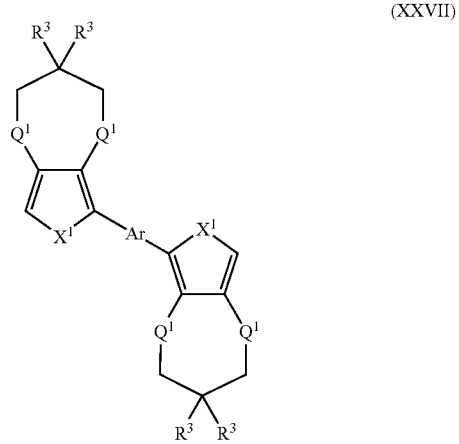

(XXVII)

wherein $X^1$, $R^3$, $Q^1$, and Ar are as previously defined; and wherein each occurrence of $X^1$, $R^3$, or $Q^1$ may be the same or different.

Other suitable monomers and co-monomers include compounds having the general structure (XXVIII):

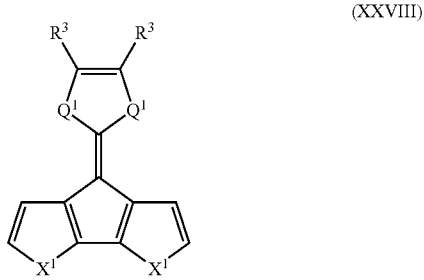

(XXVIII)

wherein $X^1$, $R^3$, and $Q^1$ are as previously defined; and wherein each occurrence of $X^1$, $R^3$, or $Q^1$ may be the same or different.

Yet other suitable monomers and co-monomers include compounds having the general structure (XXIX):

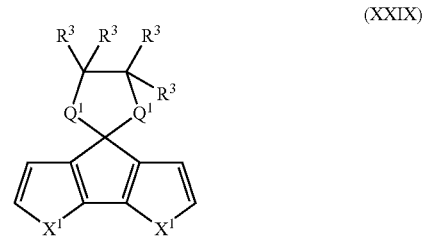

(XXIX)

wherein $X^1$, $R^3$, and $Q^1$ are as previously defined; and wherein each occurrence of $X^1$, $R^3$, or $Q^1$ may be the same or different.

The conjugated polymers may be formed into layers by first dissolving or dispersing the polymer in an appropriate solvent. The solvent may include organic solvents such as aliphatic alcohols (e.g., methanol and ethanol); aliphatic ketones (e.g., acetone and methyl ethyl ketone); aliphatic carboxylic esters (e.g., ethyl acetate); aromatic hydrocarbons (e.g., toluene and xylene); aliphatic hydrocarbons (e.g., hexane); aliphatic nitriles (e.g., acetonitrile); chlorinated hydrocarbons (e.g., dichloromethane); aliphatic sulfoxides (e.g., dimethyl sulfoxide); and the like, as well as mixtures comprising at least one of the foregoing organic solvents. Aqueous solvents can also be used such as water or water combined with one or more water-miscible organic solvents such as lower alcohols, acetonitrile, tetrahydrofuran, dimethylacetamide, dimethyl formamide, and the like.

Dispersions or solutions containing the conjugated polymers can be formed into films by applying the dispersions or solutions to a substrate via conventional processes including ink jet printing, screen printing, roll to roll printing processes, reel to reel processing, spin coating, meniscus and dip coating, spray coating, brush coating, doctor blade application, curtain casting, drop casting, and the like, to form a layer. Suitable substrates are solid materials (flexible or rigid) suitable for deposition of the polymeric compositions, and may be, for example, glass, an organic polymer such as a plastic, silicon, a mineral, a semiconducting material, a ceramic, a metal, and the like, as well as a combination comprising at least one of the foregoing materials. The substrate may be inherently conductive.

The liquid may be removed from the layer of the dispersion or solution by conventional techniques to form a film. Removal of the liquid may be effected at room temperature or other temperature that does not adversely affect the properties of the resulting film. However, to obtain higher processing speeds, the film can be dried at elevated temperatures.

The electrical conductivity of the conjugated polymer films can be readily modified, if necessary, to meet the requirements of a desired application by doping with conventional acidic dopants (p-dopants) or basic dopants (n-dopants) known in the art. Suitable p-dopants include mineral acids such as HCl, $HNO_3$, $H_2SO_4$, $H_3PO_4$, HBr, and HI; organic sulfonic acids such as dodecyl benzene sulfonic acid, lauryl sulfonic acid, camphor sulfonic acid, organic acid dyes, methane sulfonic acid, and toluene sulfonic acid; polymeric sulfonic acids such as poly(styrene sulfonic acid) and copolymers of styrene sulfonic acids; carboxylic acids such as adipic acid, azelaic acid, and oxalic acid; and polycarboxylic acids such as poly(acrylic acid), poly(maleic acid), poly (methacrylic acid), and copolymers formed from acrylic acid, maleic acid, and/or methacrylic acid. Conventional mixed dopants comprising one or more of the foregoing, such as a mixture of a mineral acid and an organic acid, can also be used to impart the desired electroactive character to the films. Suitable basic dopants include, but are not limited to Na, K, Li, and Ca. Other suitable dopants include $I_2$, $PF_6$, $SbF_6$, and $FeCl_3$. In some instances the oxidant and the dopant may be the same.

Admixtures of the polymer with other electroactive materials such as laser dyes, other electroactive polymers, hole transport or electron transport materials, including electroactive organometallic compounds, are also contemplated herein. Such materials can be added to the polymer before or after formation of the solution or dispersion. Additives such as ethylene glycol, diethylene glycol, mannitol, propylene 1,3-glycol, butane 1,4-glycol, N-methylpyrrolidone, sorbitol, glycerol, propylene carbonate, and other appropriate high boiling organics may be added to dispersions of the polymeric compositions to improve conductivity.

Additional additives may also be used, and include conductive fillers such as particulate copper, silver, nickel, aluminum, carbon black (carbon nanotubes, buckminister fullerene), and the like; non-conductive fillers such as talc, mica, wollastonite, silica, clay, dyes, pigments (zeolites), and the like, to promote specific properties such as increased modulus, surface hardness, surface color and the like; antioxidants; UV stabilizers; viscosity modifiers; and surfactants such as acetylenic diols, surfactants typically being added to control stability, surface tension, and surface wettability.

Exemplary electrode materials for use in the electrochromic devices can include inorganic materials such as glass-indium doped tin oxide (glass-ITO), gold, platinum, metal alloys such as stainless steel ("SS"), SS 316, SS316L, nickel and/or cobalt alloys such as Hastelloy-B® (Ni62/Mo28/Fe5/Cr/Mn/Si), Hastelloy-C®, and the like; and organic materials such as conductive polymer poly(3,4-ethylenedioxythiophene)-polystyrene sulfonate (PEDOT-PSS), and the like.

Exemplary electrolyte materials for use in the electrochromic devices can be aqueous or organic based, or solid. Examples of aqueous electrolytes include aqueous solutions containing dissolved salts and/or polymers, e.g., polyvinyl alcohol. Examples of organic electrolytes include organic liquids such as polyethylene carbonate and propylene carbonate. Solid electrolytes may comprise poly(ethylene oxide) and poly(vinyl alcohol). Suitable gel electrolytes include, for example, lithium trifluomethanesulfonate, lithium trifluoromethanesulfonimide, tetraalkylammonium hexafluorophosphates, tetraalkylammonium tosylates, (but not limited to) dissolved in a polymer matrix such as polyacrylics (for example, polymethylmethacrylate, polyalkylacrylate), polystyrenics, homopolymers and copolymers of polyethyleneglycol in the main chain, side-chain, comb-like or cross-linked. Furthermore, these gel electrolytes can also be plasticized, for example, with ethylene or propylene carbonate, butyrolactone, low molecular weight polyethylene glycols (number average molecular weight of 300-900 g/mol).

The electrochromic devices described herein can be used for a variety of applications including display applications (e.g., billboards and signs, video monitors, flat panel displays, flexible displays, and the like), computers, electrochromic windows, sunroofs, wind-shields, visors, goggles, and more common forms of vision wear such as eyeglasses, electronic books, electrical wiring, photovoltaic devices, capacitors, batteries, and the like.

The following illustrative examples are provided to further describe how to make and use the electrochromic devices and are not intended to limit the scope of the claimed invention.

Examples

Poly(thieno[3,4-b]thiophene) and poly(dibenzylProDOT) were electrochemically deposited at a potential of 1.3 V (versus non-aqueous Ag/Ag$^+$, calibrated to be 0.45 V versus NHE) onto one-side of ITO coated glass. The oxidized poly (thieno[3,4-b]thiophene) coated on the ITO-glass was switched to the neutral form in 0.1 M lithium triflate solution by applying −0.8 V (versus non-aqueous Ag/Ag$^+$). The gel-electrolyte composed of 7.0 grams (g) poly(ethyleneglycolethylether methacrylate), 1.0 g lithium trifluoromethanesulfonate, 3.0 g propylene carbonate and 17.5 milligrams (mg) 2,2-dimethoxy-2-acetophenone was sandwiched between the neutral (thieno[3,4-b]thiophene) and the oxidized poly(dibenzylProDOT) and cured for 20 min using a 365 nm UV lamp. 50-100 mm glass beads dispersed in the gel electrolyte composition acted as the spacer to keep the two electrodes apart. The sides of the solid-state device was then sealed using a polyurethane-acrylate to prevent moisture from entering the device. The device was found to have an operating potential of −1.0 to 1.0 V. This transmissive electrochromic device was dark blue at −1.0 V and upon switching to +1.0 V turned to a transmissive sky blue color (poly(thieno[3,4-b]thiophene) containing electrode was the ground).

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including", and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All ranges disclosed herein are inclusive and combinable.

The essential characteristics of the present invention are described completely in the foregoing disclosure. One skilled in the art can understand the invention and make various modifications without departing from the basic spirit of the invention, and without deviating from the scope and equivalents of the claims, which follow. Moreover, any combination of the above-described elements in all possible variations thereof is encompassed by the invention unless otherwise indicated herein or otherwise clearly contradicted by context.

What is claimed is:

1. An electrochromic device, comprising:
   a first layer comprising a first conjugated polymer, wherein the first conjugated polymer has a band gap of less than or equal to about 1.5 eV and an Lmax absorption peak of greater than or equal to about 750 nm in the neutral, oxidized, and reduced forms, and wherein the first layer functions as an ion-storage layer;
   a second layer comprising a second conjugated polymer, wherein the second conjugated polymer has a band gap of less than about 2.5 eV and wherein the second layer functions as an electrochromic in the visible region of the electromagnetic spectrum;
   an electrolyte layer disposed between and in contact with the first layer and the second layer;
   a first electrode in electrical communication with the first layer; and
   a second electrode in electrical communication with the second layer.

2. The electrochromic device of claim 1, wherein the first conjugated polymer is electrochromic in the infrared region, near infrared region, or both infrared and near infrared regions of the electromagnetic spectrum.

3. The electrochromic device of claim 1, wherein the first conjugated polymer, when oxidized, is absorbing in the infrared region, near infrared region, or both infrared and near infrared regions of the electromagnetic spectrum.

4. The electrochromic device of claim 1, wherein the first conjugated polymer exhibits substantially no absorbance in the visible region of the electromagnetic spectrum when in the neutral, oxidized, and reduced states.

5. The electrochromic device of claim 1, wherein the first conjugated polymer, second conjugated polymer, or a combination thereof has a band gap of less than or equal to about 1.3 eV.

6. The electrochromic device of claim 1, wherein the first conjugated polymer, second conjugated polymer, or a combination thereof has a band gap of less than or equal to about 1.1 eV.

7. The electrochromic device of claim 1, wherein the first conjugated polymer, second conjugated polymer, or a combination thereof has a band gap of less than or equal to about 0.9 eV.

8. The electrochromic device of claim 1, wherein the second conjugated polymer has a band gap of about 1.7 to about 2.2 eV.

9. The electrochromic device of claim 1, wherein the first conjugated polymer comprises units derived from monomers according to the structure (I), (II), or (III):

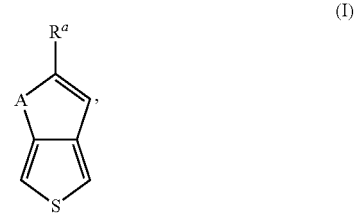

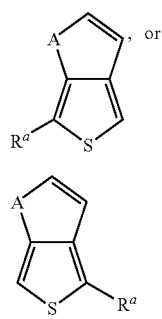

wherein A is S or O; and wherein Ra is hydrogen, hydroxyl, $C_6$-$C_{12}$ aryl, $C_3$-$C_{10}$ cycloalkyl, $C_1$-$C_{12}$ alkyl, halogen, $C_1$-$C_{12}$ alkoxy, $C_1$-$C_{12}$ alkylthio, $C_1$-$C_{12}$ haloalkyl, $C_1$-$C_{12}$ haloalkoxy, $C_6$-$C_{12}$ haloaryl, pyridyl, cyano, thiocyanato, nitro, amino, $C_1$-$C_{12}$ alkylamino, $C_1$-$C_{12}$ minoalkyl, acyl, sulfoxyl, sulfonyl, sulfonate, phosphonate, amido, or carbamoyl.

10. The electrochromic device of claim 9, wherein the first conjugated polymer is a homopolymer.

11. The electrochromic device of claim 9, wherein $R^a$ is hydrogen or alkyl.

12. The electrochromic device of claim 9, wherein the polymer is a copolymer comprising, in addition to the units derived from monomer (I), (II), or (III), units derived from a co-monomer reactive with monomer (I), (II), or (III).

13. The electrochromic device of claim 12, wherein the co-monomer is thiophene, substituted thiophene, dithieno[3,4-b:3',4-d]thiophene, bithiophene, pyrrole, substituted pyrrole, or a combination comprising at least one of the foregoing co-monomers, wherein the substituents are one or more of hydroxyl, $C_6$-$C_{12}$ aryl, $C_3$-$C_{10}$ cycloalkyl, $C_1$-$C_{12}$ alkyl, halogen, $C_1$-$C_{12}$ alkoxy, $C_1$-$C_{12}$ alkylthio, $C_1$-$C_{12}$ haloalkyl, $C_6$-$C_{12}$ haloaryl, pyridyl, cyano, thiocyanato, nitro, amino, $C_1$-$C_{12}$ alkylamino, $C_1$-$C_{12}$ aminoalkyl, acyl, sulfoxyl, sulfonyl, sulfonate, phosphonate, amido, carbamoyl, or a combination comprising at least one of the foregoing substituents.

14. The electrochromic device of claim 12, wherein the co-monomer is

wherein $X^1$ is S, O, or N—$R^5$, wherein $R^5$ is hydrogen or $C_1$-$C_{12}$ alkyl; X is $C_1$-$C_4$ alkylene or substituted $C_1$-$C_4$ alkylene;

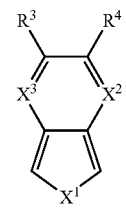

wherein $X^1$ is as previously defined, and wherein $R^3$ and $R^4$ are the same or different and are hydrogen, hydroxyl, $C_6$-$C_{12}$ aryl, $C_3$-$C_{10}$ cycloalkyl, $C_1$-$C_{12}$ alkyl, halogen, $C_{1-12}$ alkoxy, $C_1$-$C_{12}$ alkylthio, $C_1$-$C_{12}$ haloalkoxy, $C_1$-$C_{12}$ haloalkyl, or $C_6$-$C_{12}$ halo aryl, —$C_1$-$C_6$ alkyl-O—$C_1$-$C_6$ alkyl, or —$C_1$-$C_6$ alkyl-O—$C_6$-$C_{12}$ aryl;

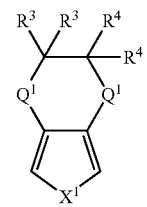

wherein Q' is S or O;

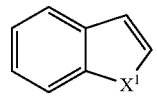

wherein $X^1$, $R^2$, and $R^4$ are as previously defined, and wherein $X^2$ and $X^3$ are the same or different and are CH or N;

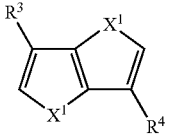

wherein $X^1$, $Q^1$, $R^3$, and $R^2$ are as previously defined, and wherein each occurrence of $Q^1$, $R^3$, or $R^4$ may be the same or different;

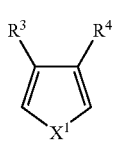

wherein $X^1$ is as previously defined;

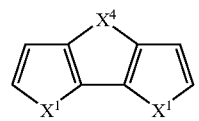

wherein $X^1$, $R^3$, and $R^4$ are as previously defined, and wherein each occurrence of $X^1$ may be the same or different;

wherein $X^1$ is as previously defined, and wherein each occurrence of $X^1$ may be the same or different; and $X^4$ is $C(R^3)_2$, S, O, or N—$R^5$, wherein $R^3$ and $R^5$ are as previously defined;

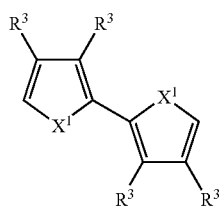

(XII)

wherein $X^1$ and $R^3$ are as previously defined, and wherein each occurrence of $X^1$ or $R^3$ may be the same or different;

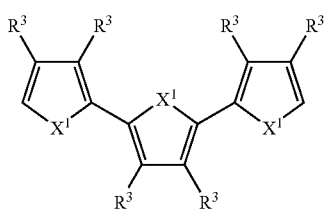

(XIII)

wherein $X^1$ and $R^3$ are as previously defined, and wherein each occurrence of $X^1$ or $R^3$ may be the same or different;

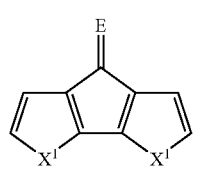

(XIV)

wherein $X^1$ is as previously defined, and wherein each occurrence of $X^1$ may be the same or different, and E is O or $C(R^7)_2$, wherein each occurrence of $R^7$ is an electron withdrawing group;

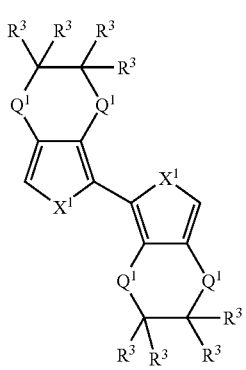

(XV)

wherein $X^1$, $Q^1$, and $R^3$ are as previously defined, and wherein each occurrence of $X^1$, $Q^1$, or $R^3$ may be the same or different;

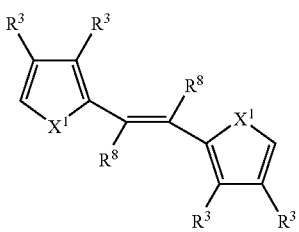

(XVI)

wherein $X^1$ and $R^3$ are as previously defined, and wherein each occurrence of $X^1$ or $R^3$ may be the same or different, and each occurrence of $R^8$ is hydrogen, $C_1$-$C_6$ alkyl, or cyano;

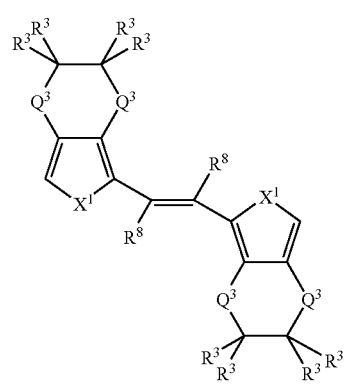

(XVII)

wherein $X^1$, $R^3$, and $R^8$ are as previously defined, and wherein each occurrence of $X^1$, $R^3$, or may be the same or different, and each occurrence of $Q^3$ is independently $CH_2$, S, or O;

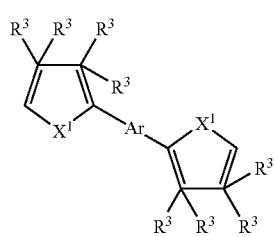

(XVIII)

wherein $X^1$ and $R^3$ are as previously defined, and wherein each occurrence of $X^1$ or $R^3$ may be the same or different, and Ar is a furan, pyrrole, N-substituted pyrrole, phenyl, biphenyl, thiophene, fluorene, or 9-alkyl-9H-carbazole;

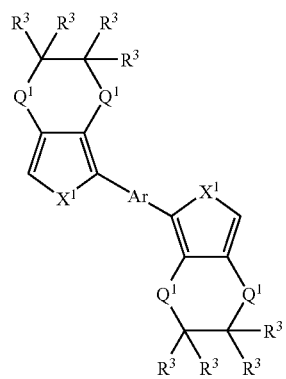
(XIX)

wherein $X^1$, $Q^1$, $R^3$, and Ar are as previously defined, and wherein each occurrence of $X^1$, $Q^1$, or $R^3$ may be the same or different;

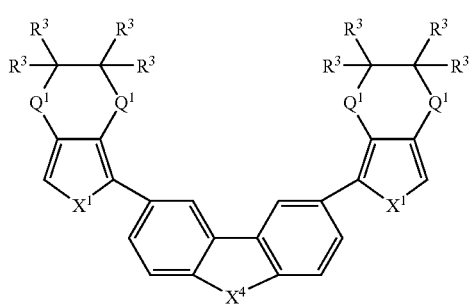
(XX)

wherein $X^1$, $X^4$, $Q^1$, and $R^3$ are as previously defined, and wherein each occurrence of $X^1$, $Q^1$, or $R^3$ may be the same or different;

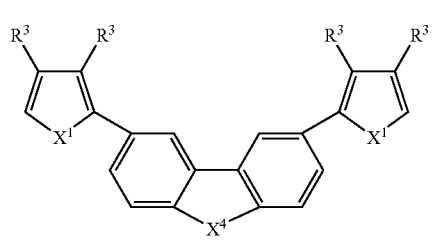
(XXI)

wherein $X^1$, $X^4$, and $R^3$ are as previously defined, and wherein each occurrence of $X^1$ or may be the same or different;

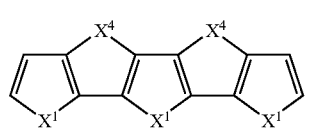
(XXII)

wherein $X^1$ and $X^4$ are as previously defined, and wherein each occurrence of $X^1$ or $X^4$ may be the same or different;

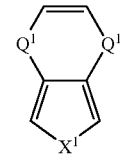
(XXIII)

wherein $X^1$ and $Q^1$ are as previously defined, and wherein each occurrence of $Q^1$ may be the same or different;

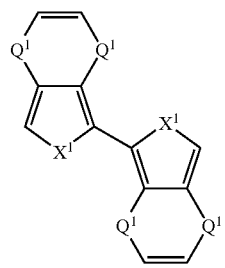
(XXIV)

wherein $X^1$ and $Q^1$ are as previously defined, and wherein each occurrence of $X^1$ or $Q^1$ may be the same or different;

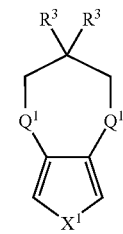
(XXV)

wherein $X^1$, $R^3$, and $Q^1$ are as previously defined, and wherein each occurrence of $R^3$ or may be the same or different;

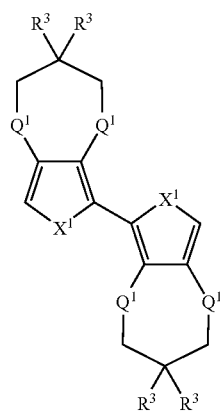
(XXVI)

wherein $X^1$, $R^3$, and $Q^1$ are as previously defined, and wherein each occurrence of $X^1$, $R^3$, or $Q^1$ may be the same or different;

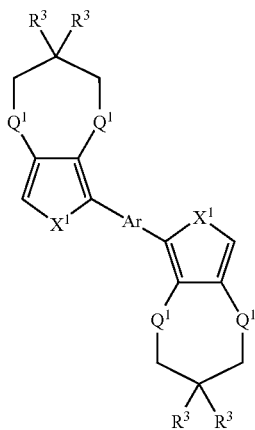

(XXVII)

wherein $X^1$, $R^3$, $Q^1$, and Ar are as previously defined, and wherein each occurrence of $X^1$, $R^3$, or $Q^1$ may be the same or different;

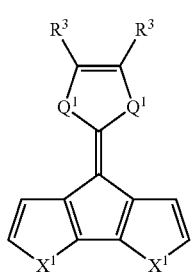

(XXVIII)

wherein $X^1$, $R^3$, and $Q^1$ are as previously defined, and wherein each occurrence of $X^1$, $R^3$, or $Q^1$ may be the same or different;

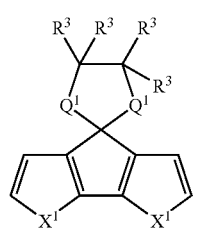

(XXIX)

wherein $X^1$, $R^3$, and $Q^1$ are as previously defined, and wherein each occurrence of $X^1$, $R^3$, or $Q^1$ may be the same or different; or a combination comprising at least one of the foregoing co-monomers.

15. The electrochromic device of claim 1, wherein the first conjugated polymer, the second conjugated polymer, or a combination thereof has been doped with a p-dopant or an n-dopant.

16. The electrochromic device of claim 1, wherein the first and second electrodes are glass-indium doped tin oxide (glass-ITO), poly(3,4-ethyl enedioxythiophene)-polystyrene sulfonate (PEDOT-PSS), thin gold layer, platinum, metal alloys, stainless steel alloys, or nickel alloys.

17. The electrochromic device of claim 1, wherein the electrolyte layer is a gel electrolyte comprising lithium trifluoromethanesulfonate, lithium trifluoromethanesulfonimide, tetraalkylammonium hexafluorophosphates, tetraalkylammonium tosylates, or N-alkylimmidazoliunium salts dissolved in a polymer matrix, wherein the polymatrix is a poly (meth)acrylic, a polystyrenic, or a homopolymer or copolymer of polyethyleneglycol; and wherein the gel electrolyte is optionally plasticized.

18. The electrochromic device of claim 1, wherein the device is a display, a flexible color display, an attenuator, or a transmission device.

19. An electrochromic device, comprising:

a first layer comprising a first conjugated polymer, wherein the first conjugated polymer has a band gap of less than or equal to about 1.5 eV and a Lmax absorption peak of greater than or equal to about 750 nm in the neutral, oxidized, and reduced forms, and wherein the first layer functions as an ion-storage layer;

a second layer comprising an ion-chelating inorganic structure that reversibly binds to counter-ions;

an electrolyte layer in contact with the first layer and the second layer;

a first electrode in electrical communication with the first layer; and a second electrode in electrical communication with the second layer.

20. The electrochromic device of claim 19, wherein the ion-chelating inorganic structure is tungsten oxide, nickel oxide or other metal oxide layers.

21. The electrochromic device of claim 19, wherein the first conjugated polymer is electrochromic in the infrared region, near infrared region, or both infrared and near infrared regions of the electromagnetic spectrum.

22. The electrochromic device of claim 19, wherein the first conjugated polymer, when oxidized, is absorbing in the infrared region, near infrared region, or both infrared and near infrared regions of the electromagnetic spectrum.

23. The electrochromic device of claim 19, wherein the first conjugated polymer exhibits substantially no absorbance in the visible region of the electromagnetic spectrum when in the neutral, oxidized, and reduced states.

24. The electrochromic device of claim 19, wherein the first conjugated polymer has a band gap of less than or equal to about 1.3 eV.

25. The electrochromic device of claim 19, wherein the first conjugated polymer has a band gap of less than or equal to about 1.1 eV.

26. The electrochromic device of claim 19, wherein the first conjugated polymer comprises units derived from monomers according to the structure (I), (II), or (III):

(I)

-continued

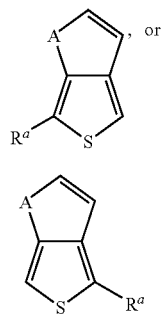
(II), or (III)

wherein A is S or O; and wherein Ra is hydrogen, hydroxyl, $C_6$-$C_{12}$ aryl, $C_3$-$C_{10}$ cycloalkyl, $C_1$-$C_{12}$ alkyl, halogen, $C_1$-$C_{12}$ alkoxy, $C_1$-$C_{12}$ alkylthio, $C_1$-$C_{12}$ haloalkyl, $C_1$-$C_{12}$ haloalkoxy, $C_6$-$C_{12}$ haloaryl, pyridyl, cyano, thiocyanato, nitro, amino, $C_1$-$C_{12}$ alkylamino, $C_1$-$C_{12}$ aminoalkyl, acyl, sulfoxyl, sulfonyl, sulfonate, phosphonate, amido, or carbamoyl.

27. The electrochromic device of claim 26, wherein the first conjugated polymer is a homopolymer.

28. The electrochromic device of claim 26, wherein Ra is hydrogen or $C_1$-$C_4$ alkyl.

29. The electrochromic device of claim 26, wherein the polymer is a copolymer comprising, in addition to the units derived from monomer (I), (II), or (III), units derived hm a co-monomer reactive with monomer (I), (II), or (III).

30. The electrochromic device of claim 29, wherein the co-monomer is thiophene, substituted thiophene, dithieno[3,4-b:3',4'-dithiophene, bithiophene, pyrrole, substituted pyrrole, phenylene, substituted phenylene, naphthalene, substituted naphthalene, biphenyl, substituted biphenyl, terphenyl, substituted terphenyl, phenylene vinylene, substituted phenylene vinylene, or a combination comprising at least one of the foregoing co-monomers, wherein the substituents are one or more of hydroxyl, $C_6$-$C_{12}$ aryl, $C_3$-$C_{10}$ cycloalkyl, $C_1$-$C_{12}$ alkyl, halogen, $C_1$-$C_{12}$ alkoxy, $C_1$-$C_{12}$ alkylthio, $C_1$-$C_{12}$ haloalkyl, $C_6$-$C_{12}$ haloaryl, pyridyl, cyano, thiocyanato, nitro, amino, $C_1$-$C_{12}$ alkylamino, $C_1$-$C_{12}$ aminoalkyl, acyl, sulfoxyl, sulfonyl, sulfonate, phosphonate, amido, carbamoyl, or a combination comprising at least one of the foregoing substituents.

31. The electrochromic device of claim 29, wherein the co-monomer is

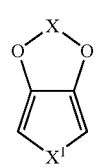
(IV)

wherein $X^1$ is S, O, or N—$R^5$, wherein $R^5$ is hydrogen or $C_1$-$C_{12}$ alkyl; X is $C_1$-$C_4$ alkylene or substituted $C_1$-$C_4$ alkylene;

wherein $X^1$ is as previously defined,

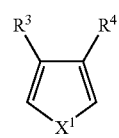
(V)

wherein $R^3$ and $R^4$ are the same or different and are hydrogen, hydroxyl, $C_6$-$C_{12}$ aryl, $C_3$-$C_{10}$ cycloalkyl, $C_1$-$C_{12}$ alkyl, halogen, $C_1$-$C_{12}$ alkoxy, $C_1$-$C_{12}$ alkylthio, $C_1$-$C_{12}$ haloalkoxy, $C_1$-$C_{12}$ haloalkyl, or $C_6$-$C_{12}$ haloaryl, —$C_1$-$C_6$ alkyl-0-$C_1$-$C_6$ alkyl, or —$C_1$-$C_6$ alk1-O—$C_6$-$C_{12}$ aryl;

(VI)

wherein $Q^1$ is S or O;

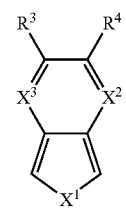
(VII)

wherein $X^1$, $R^3$, and $R^4$ are as previously defined, and wherein $X^2$ and $X^3$ are the same or different and are CH or N;

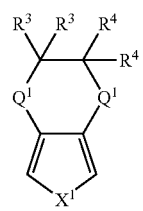
(VIII)

wherein $X^1$, $Q^1$, $R^3$, and $R^4$ are as previously defined, and wherein each occurrence of $Q^1$, $R^3$, or $R^4$ may be the same or different;

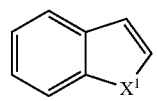
(IX)

wherein $X^1$ is as previously defined;

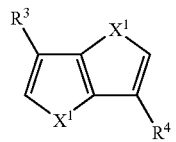
(X)

wherein $X^1$, $R^3$, and $R^4$ are as previously defined, and wherein each occurrence of $X^1$ may be the same or different;

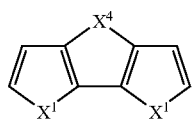
(XI)

wherein $X^1$ is as previously defined; and wherein each occurrence of $X^1$ may be the same or different, and $X^4$ is $c(R^3)_2$, S, O, or N—$R^5$, wherein $R^3$ and $R^5$ are as previously defined;

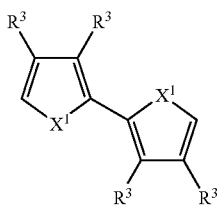
(XII)

wherein $X^1$ and $R^3$ are as previously defined, and wherein each occurrence of $X^1$ or $R^3$ may be the same or different;

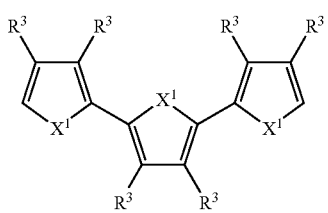
(XIII)

wherein $X^1$ and $R^3$ are as previously defined, and wherein each occurrence of $X^1$ or $R^3$ may be the same or different;

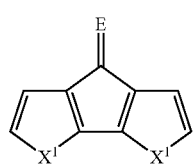
(XIV)

wherein $X^1$ is as previously defined, and wherein each occurrence of $X^1$ may be the same or different, and E is O or $C(R^7)_2$, wherein each occurrence of $R^7$ is an electron withdrawing group;

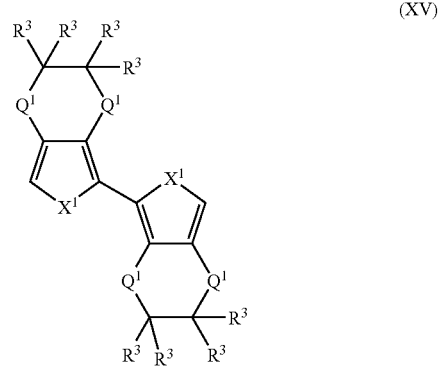
(XV)

wherein $X^1$, $Q^1$, and $R^3$ are as previously defined, and wherein each occurrence of $X^1$, $Q^1$, or
$R^3$ may be the same or different;

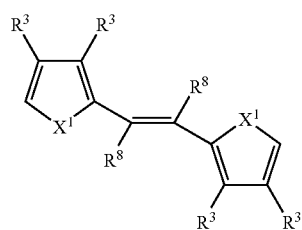
(XVI)

wherein $X^1$ and $R^3$ are as previously defined, and wherein each occurrence of $X^1$ or $R^3$ may be the same or different, and each occurrence of $R^8$ is hydrogen, $C_1$-$C_6$ alkyl, or cyano;

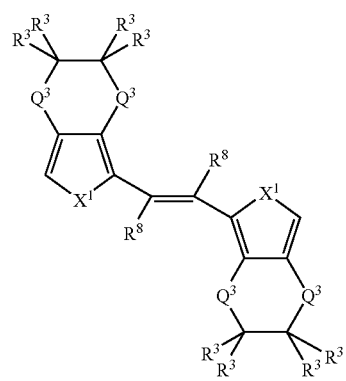
(XVII)

wherein $X^1$, $R^3$, and $R^8$ are as previously defined, and wherein each occurrence of $X^1$, $R^3$, or $R^8$ may be the same or different; and each occurrence of $Q^3$ is independently CH, S or O

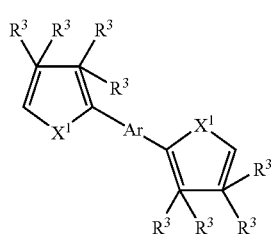
(XVIII)

wherein $X^1$ and $R^3$ are as previously defined, and wherein each occurrence of $X^1$ or $R^3$ may be the same or different, and Ar is a furan, pyrrole, N-substituted pyrrole, phenyl, biphenyl, thiophene, fluorene, or 9-alkyl-9H-carbazole;

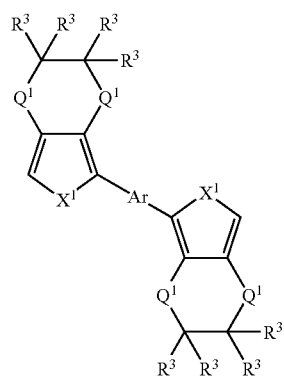
(XIX)

wherein $X^1$, $Q^1$, $R^3$, and Ar are as previously defined, and wherein each occurrence of $X^1$, $Q^1$, or $R^3$ may be the same or different;

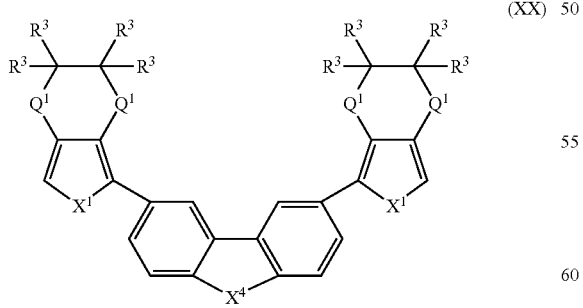
(XX)

wherein $X^1$, $X^4$, $Q^1$, and $R^3$ are as previously defined, and wherein each occurrence of $X^1$, $Q^1$, or $R^3$ may be the same or different;

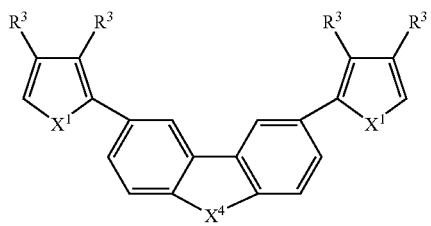
(XXI)

wherein $X^1$, $X^3$, and $R^3$ are as previously defined, and wherein each occurrence of $X^1$ or may be the same or different;

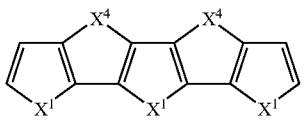
(XXII)

wherein $X^1$ and $X^4$ are as previously defined, and wherein each occurrence of $X^1$ or $X^4$ may be the same or different;

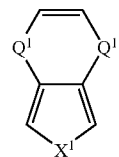
(XXIII)

wherein $X^1$ and $Q^1$ are as previously defined, and wherein each occurrence of $Q^1$ may be the same or different;

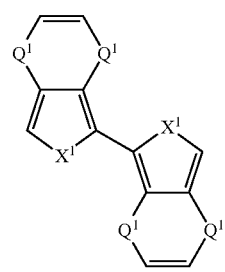
(XXIV)

wherein $X^1$ and $Q^1$ are as previously defined, and wherein each occurrence of $X^1$ or $Q^1$ may be the same or different;

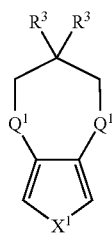

(XXV)

wherein $X^1$, $R^3$, and $Q^1$ are as previously defined, and wherein each occurrence of $R^3$ or $Q^1$ may be the same or different;

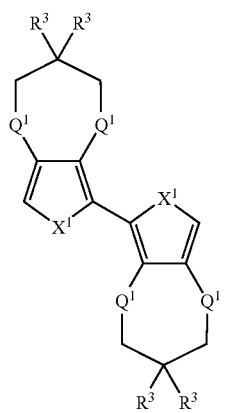

(XXVI)

wherein $X^1$, $R^3$, and $Q^1$ are as previously defined, and wherein each occurrence of $X^1$, $R^3$, or $Q^1$ may be the same or different;

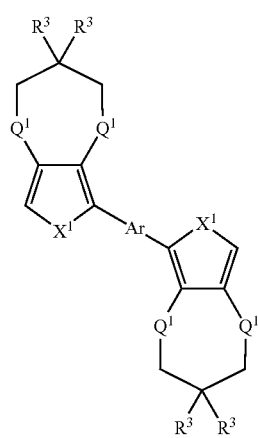

(XXVII)

wherein $X^1$, $R^3$, $Q^1$, and Ar are as previously defined, and wherein each occurrence of $X^1$, $R^3$, or $Q^1$ may be the same or different;

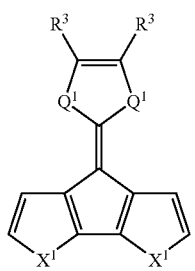

(XXVIII)

wherein $X^1$, $R^3$, and $Q^1$ are as previously defined, and wherein each occurrence of $X^1$, $R^3$, or $Q^1$ may be the same or different;

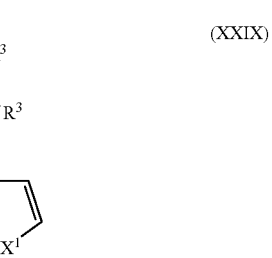

(XXIX)

wherein $X^1$, $R^3$, and $Q^1$ are as previously defined, and wherein each occurrence of $X^1$, $R^3$, or $Q^1$ may be the same or different; or a combination comprising at least one of the foregoing co-monomers.

32. The electrochromic device of claim 19, wherein the first conjugated polymer has been doped with a p-dopant or an n-dopant.

33. The electrochromic device of claim 19, wherein the first and second electrodes are glass-indium doped tin oxide (glass-ITO).

34. The electrochromic device of claim 19, wherein the electrolyte layer is a gel electrolyte comprising lithium trifluomethanesulfonate, lithium trifluoromethanesulfonimide, tetraalkylammonium hexafluorophosphates, tetraalkylammonium tosylates, or N-alkylimmidazoliunium salts dissolved in a polymer matrix, wherein the polymatrix is a poly(meth)acrylic, a polystyrenic, or a homopolymer or copolymer of polyethyleneglycol; and wherein the gel electrolyte is optionally plasticized.

35. An electrochromic device, comprising:
a substantially transparent outer layer;
a first electrode located behind the transparent outer layer, wherein the first electrode comprises a reflective surface facing the outer layer and a means for allowing ions to pass through the first electrode;
a first layer comprising a first conjugated polymer disposed between the reflective surface and the transparent outer layer and in electrical communication with the first electrode, wherein the first conjugated polymer is an electrochromic material;
a first electrolyte layer in contact with the first layer and the first electrode;

a second electrode located behind the transparent outer layer and behind the first electrode;

a second layer comprising a second conjugated polymer, wherein the second conjugated polymer has a band gap of less than or equal to about 1.5 eV and an Lmax absorption peak of greater than or equal to about 750 nm in the neutral, oxidized, and reduced forms, wherein the second layer is disposed on and in electrical communication with the second electrode; and a second electrolyte layer disposed between the second layer and the first electrode.

* * * * *